United States Patent [19]

Schmidt et al.

[11] Patent Number: 4,873,694

[45] Date of Patent: Oct. 10, 1989

[54] SWITCHING CONFIGURATION FOR PCM TIME DIVISION MULTIPLEX TELEPHONE EXCHANGE HAVING A CENTRAL SWITCHING NETWORK AND INDIVIDUAL SUB-SWITCHING NETWORKS

[75] Inventors: Lothar Schmidt, Fuerstenfeldbruck; Alfred Jugel, Geretsried, both of Fed. Rep. of Germany

[73] Assignee: Siemens Aktiengesellschaft, Berlin and Munich, Fed. Rep. of Germany

[21] Appl. No.: 247,998

[22] Filed: Sep. 22, 1988

[30] Foreign Application Priority Data

Oct. 6, 1987 [DE] Fed. Rep. of Germany ....... 3733765

[51] Int. Cl.[4] .......................................... H04Q 11/04
[52] U.S. Cl. .................................................. 370/58.1
[58] Field of Search ................... 370/58, 54, 16; 371/8

[56] References Cited

U.S. PATENT DOCUMENTS 4,763,316 8/1988 Schaich et al. ..................... 370/58

FOREIGN PATENT DOCUMENTS 3128365 7/1981 Fed. Rep. of Germany .
3106903 9/1981 Fed. Rep. of Germany .
3717387.1 1/1987 Fed. Rep. of Germany .
3717386.3 3/1987 Fed. Rep. of Germany .

OTHER PUBLICATIONS

Journal Telcom Report, vol. IV (1981), Supplement Digitalvermittlangssystem EWSD, pp. 1-72.

Primary Examiner—Benedict V. Safourek
Assistant Examiner—Wellington Chin
Attorney, Agent, or Firm—Jeffrey P. Morris

[57] ABSTRACT

A switching configuration for PCM TDM telecommunication exchange insallations, having a central switching network and individual sub-switching networks is provided.

Line groups having duplicated central switching networks connected over two time division multiplex lines and having a sub-switching network and a group control system each are assigned to each other in pairs. The line systems assigned individually to the one and the other of two line groups and which are connected via internal lines in normal operation to the sub-switching networks of their own line group, can be switched over to the sub-switching network of the other line group. No connections are interrupted which were already through-connected before changeover switching or were in the process of being set up, and the internal lines running form the line system of one line group can be switched over singly, i.e. individually to the connection, from its sub-switching network to that of the partner line group. Unseized internal lines are switched over, or also connections in the call phase are through-connected. For new connections, only already switched-over internal lines are available.

12 Claims, 2 Drawing Sheets

SWITCHING CONFIGURATION FOR PCM TIME DIVISION MULTIPLEX TELEPHONE EXCHANGE HAVING A CENTRAL SWITCHING NETWORK AND INDIVIDUAL SUB-SWITCHING NETWORKS

BACKGROUND OF THE INVENTION

1. Field of the Invention

The present invention relates to a switching configuration for telecommunication exchange installations, of the PCM time division multiplex type having a central switching network and individual sub-switching networks connected thereto.

2. Description of the Prior Art

Through the Journal "telecom report", Vol. IV (1981), Supplement "Digitalvermittlungs system EWSD" (EWSD digital exchange system), at page 19, PCM telephone exchange systems are known which are equipped with a multistage central processor having time division multiplex inputs and time division multiplex outputs as well as with a plurality of line groups functioning to connect time division multiplex interexchange trunks of which each is connected to a time division multiplex input and a time division multiplex output of the switching network, and of which each has a plurality of line units functioning to connect in each instance one time division multiplex interexchange trunk, which, in turn, is connected to a time division multiplex switching system associated with the particular line group and can be connected through it to channels of the time division multiplex input corresponding to the particular line groups and the corresponding time division multiplex output of the switching network.

In telephone exchange systems of this kind time division multiplex interexchange trunks always combine a large number of channel pairs, for example twenty-four, thirty, sixty or even more. A channel pair always comprises a channel in the one transmission direction and a channel in the other transmission direction. One channel pair is required for each connection, aside from multi-channel connections. As the illustration in the journal referred to above shows, a large number of line groups for each telephone exchange is provided with a switching network which, to be on the safe side, is duplicated. Each line group comprises a plurality of line units. There are line units of different kinds depending on the specific kind of the connected lines. Subscriber lines are, as a rule, analog lines, but can also be realized in PCM technology. Interexchange trunks can also be analog lines. They can, however, also be realized as PCM channels which, in known manner, are combined in PCM transmission systems with one time division multiplex line each. The mentioned line units are constructed differently and, specifically, in each instance corresponding to the particular technology of the subscriber line and interexchange trunks to be connected and depending on whether or not analog technology or time division multiplex technology is utilized. As a rule, a line system is provided for a plurality of analog subscriber lines, for example eight. Similarly, one line unit is provided for a plurality of analog interexchange trunks. For each time division multiplex interexchange trunk of a PCM transmission system, as a rule, one line system is provided. But it would be equally possible to connect to one single line system more than one time division multiplex interexchange trunk of a PCM transmission system, for example two time division multiplex lines.

Through the natural combination of the number of channels described hereinafter in one single PCM transmission system, its assignment is obviously also limited to only one single direction because the particular channels must run the same way as the time division multiplex lines of this PCM transmission system. Since, likewise, due to this combination technique, the connection of a time division multiplex line of a PCM transmission system to a branch line unit, by necessity, also results in an assignment of the particular channels to a single line unit and, hence, to a single line group, in the event that for one direction only the channels (channel pairs of a single PCM transmission system are available upon breakdown of a line group all possibilities for connections in the particular direction fail and also, from the aspect of switching, a whole trunk group fails.

In order to avoid the previously described total failure of a trunk group due solely to the failure of a line group, until now in the prior art it was known to provide independently of each other two PCM transmission systems for each direction, and to connect the time division multiplex lines of this transmission system to line units of two different line groups. This is costly and uneconomical, particularly with small trunk groups due to duplication of the PCM transmission system.

In order not to have to provide in a switching configuration of the initially indicated kind in view of the possibility of failure of a line group duplication of a PCM transmission system for each direction, and in order to avoid in so doing that due to the failure of a line group alone, i.e. The failure of the channel pairs of the particular PCM transmission system, a whole direction can fail respectively must, for a telephone switching system of the initially indicated known kind according to Luxemburg Patent No. 86,734 (corresponds in terms of content to the European Patent application No. 87 108 702.9) it has been provided to assign two line groups pairwise to each other and it is, furthermore, provided that the line systems of each of these two line groups which, during normal operation are connected to the time division multiplex switching system of their own line group, can be switched over during emergency operation of one of the two line groups to the time division multiplex switching system of the other line group.

A PCM transmission system with its channels in the event of failure of the particular line group can continue to be operated. In this operation, a duplicate number of channels (channel pairs) is switched via a line group, i.e. via the other of the two line groups assigned to each other in pairs. This does, lead to a particularly heavy traffic load of the particular line group and, possibility to an increase of path busy occurrences, however, all connections in the process of being set up via the particular channels have the same chances of succeeding. It can happen that a plurality of directions can only be operated with half the traffic handling capacity. However, connections in all traffic directions can still be established and the total failure of the primarily affected traffic direction respectively traffic directions is prevented. By stronger proportioning of the sub switching networks of each of the line groups with respect to the number of the individual through-connection possibilities as well as with respect to the processing capacity of each of their individual control units the traffic handling capacity can, of course, again be increased in both respects.

SUMMARY OF THE INVENTION

The present invention relates to a switching configuration and, specifically to a switching configuration with centrally controlled telecommunication exchange installation, in particular PCM time division multiplex telephone exchange installation, in which a central switching networks functions for through-connecting together with a central processor functioning inter alia for its control as well as for switching signal processing is provided, and in which a plurality of peripheral line groups is equipped with one partial switching network each of outside connection of interexchange trunks and/or subscriber lines and with one individual control unit each for reception of switching signals from these lines, for switching signal preprocessing as well as for switching signal transfer to these lines, and in which in these line groups the particular switching networks on the inside are separated by groups connected via groups of link lines to switching network connections of the central switching network, and in which the line groups are each assigned to each other in pairs, and in which within each of them line units functioning for outside connection of subscriber and/or interexchange trunks and connected within the particular line group primarily to their sub switching network, for example, subscriber connection circuits, multiple subscriber connection circuits, interexchange trunks (multiple) terminal circuits and the similar, are connectable to a first of these two line groups additionally to the sub switching network of the other, hence, to a second branch line group—and conversely, whereupon for connections which run via a line unit of the first line group and via the sub-switching network of the second line groups- —and conversely—the corresponding switching signal processing as well as sub switching network setting likewise is carried out by the individual control unit of the second—respectively first—line group.

In a switching configuration of the invention, changeover switches for each line system are provided over which they are connected during normal operation to the sub-switching network of the particular line groups via which they can, however, upon their activation be connected to the sub switching network of the other line groups, i.e. also simultaneously be disconnected from that of their own line group. From this arises in this known case the problem that at the time changeover switching takes place, as a rule, already a great number of connections exist, i.e. connections, which already are completely through-connected from subscriber station to subscriber station, and that these connections are interrupted. This is very disturbing to the affected subscriber but it is also work-intensive for the particular switching center because the interrupted connections are subsequently largely established again by the same subscribers. The disturbing effect for the affected subscriber does not only consist in that telephone calls in progress are unpredictably and abruptly terminated but also in that by such interruption also connections can be affected which may be set up for the purpose of data transmission, of control, of monitoring and similar, whose forced interruption, consequently, is disturbing to a particularly great extent. Subsequent renewed setup of each of these terminated connections means, furthermore, for the particular switching installation, in particular for centrally controlled switching installations that the particular data processing as well as the central and individual switching units controlling the line through-connections are effected by an intermittent overload of lengthy duration.

In order to avoid interrupting in a switching configuration as aforementioned in connection with necessary changeover switching—for whatever reason this may become necessary—existing connections, and in order to not to have to reestablish them together with the indicated negative effects, which not only occur in the particular individual exchange but also in all other connections touched by the particular terminated and again to be established anew, in connection with such changeover switching it is already known by German Patent Application No. P 37 17 387.1, that in preparation for such changeover switching within each of these pairs of line groups assigned to each other each of the particular two individual control units connection data be transmitted which with respect to all individual connections existing via the assigned sub switching network indicate which outside sub switching network line is connected with which inside sub switching network line by each of the two individual control units via individual transmission paths in each instance individual to the line group pairs to the particular corresponding partner control unit, and that each of the two individual control units in conjunction with this transmitted connection data and in each instance received by it establishes individual sub connections via the sub switching network of the particular associated line group between inside sub switching network connections and outside sub switching network connections and, specifically such outside sub switching network connections with which the particular line units through changeover switching of the particular partner line group are connectable through the switching, and, on the other hand, such inside sub switching network lines with which through this changeover switching the line units of the particular partner line groups are connectable. Likewise, in this connection it has been suggested in similar manner already by German Patent Application No. P 37 17 386.3 that to each individual control system a connection data storage device is assigned in which for each through-connected data regarding it are stored, with respect to which outside sub-switching network connection is connected in each instance with its own kind within the same connection group or in a further connection group, that due to changeover preparation signals given for one pair of line groups and therein for one line group the particular two individual control units relative to new connection establishing commands are blocked, in particular that also connections still in the process of being set up are blocked as well as also the individual control unit of the first line group transfers the connection data stored in its connection storage to the individual control unit of the second line groups, and that it in conjunction with these connection data, which preferentially are placed in intermediate storage in the connection storage of the second line group, establishes sub connections via the particular sub switching network, the central switching network and the same or a further sub switching network, with these sub connections originating from such outside sub switching network connections with which the line units of the first line group are connectable by changeover switching.

The aforementioned solutions permit leaving intact connections already established in connection with and with the aid of the described changeover switching measures. In this sense such connections already set up can be such as extend from subscriber station to subscriber station, without the particular called subscriber already having answered, as also connections which are still in the call phase, as well as also such in which the called party has already answered, in which, thus, the particular two parties are actually already in a state in which they communicate. The suggested solutions, however, subsum the technical facts that connection still in the process of being established must be terminated, which also applies to the connection setup stage before start of pulsing, thus when the particular called subscriber has been connected with a free digit circuit without having already begun to dial, or is yet to be connected with one. Because sub control system(s) and central processors take part in completing such connections which are in the process of being established. In the process, they are in a data exchange which may not be disturbed by changeover switching measures of the mentioned kind concerning individual connections. Therefore, in the indicated suggested solutions connections which are already or still in the process of being made are not included into the changeover measures but terminated, i.e. released from the switching station so that corresponding attempts at setting up connections are started again by the particular calling subscribers whereby the particular connections are then from the outset established in the stated manner via the connection paths which have already been switched over.

The present invention is based on the technique of not needing to terminate even such connections of the kind addressed last which are in the process of being set up; it should be possible to continue the switching operation in progress without breaks and, if possible, without transitions, and the further connection setup for connections still in the process of being established, so-called "transient connections" is to be continued for each of these connections up to their particular final through-connection.

The present invention provides that the internal lines which are internal to the line groups and leading from one line system within a line group to its sub switching network within a diversion phase can be switched singly, that is individual to each connection, to the sub switching network of the other line group, that within this diversion phase carrying out changeover switching is limited to those internal lines, which are not busy, respectively which become free, for example through connection release, preferentially to these as well as additionally such internal lines via which connections are through-connected whose subscribers due to the fact that the particular called party has answered are completely connected with each other, respectively enter into connection, in particular to internal lines occupied with such connections in which the processes of establishing the connection are completed, respectively have been completely, however, the called party has not yet answered, and that with completion of the division phase the connections still at this time in the process of becoming established are released.

DESCRIPTION OF THE PREFERRED EMBODIMENT

The specification describes the operating mechanism of a modern telephone switching system in which the present invention is applied. The specification starts with known time division multiplex telephone exchange systems with PCM technology as they are variously and in great detail described in the known technical literature, for example in the above mentioned journal "telecom report". In it, on page 19, individual line groups in this telephone switching system are described. As is similarly also described in illustration 1, page 8 of the mentioned "telecom report", switching network (SN) and central processor (CP) are provided in duplicate, and which are referred to in FIG. 1 with "K1" and "K2" and with "ZW1" and "ZW2".

Figure 1:
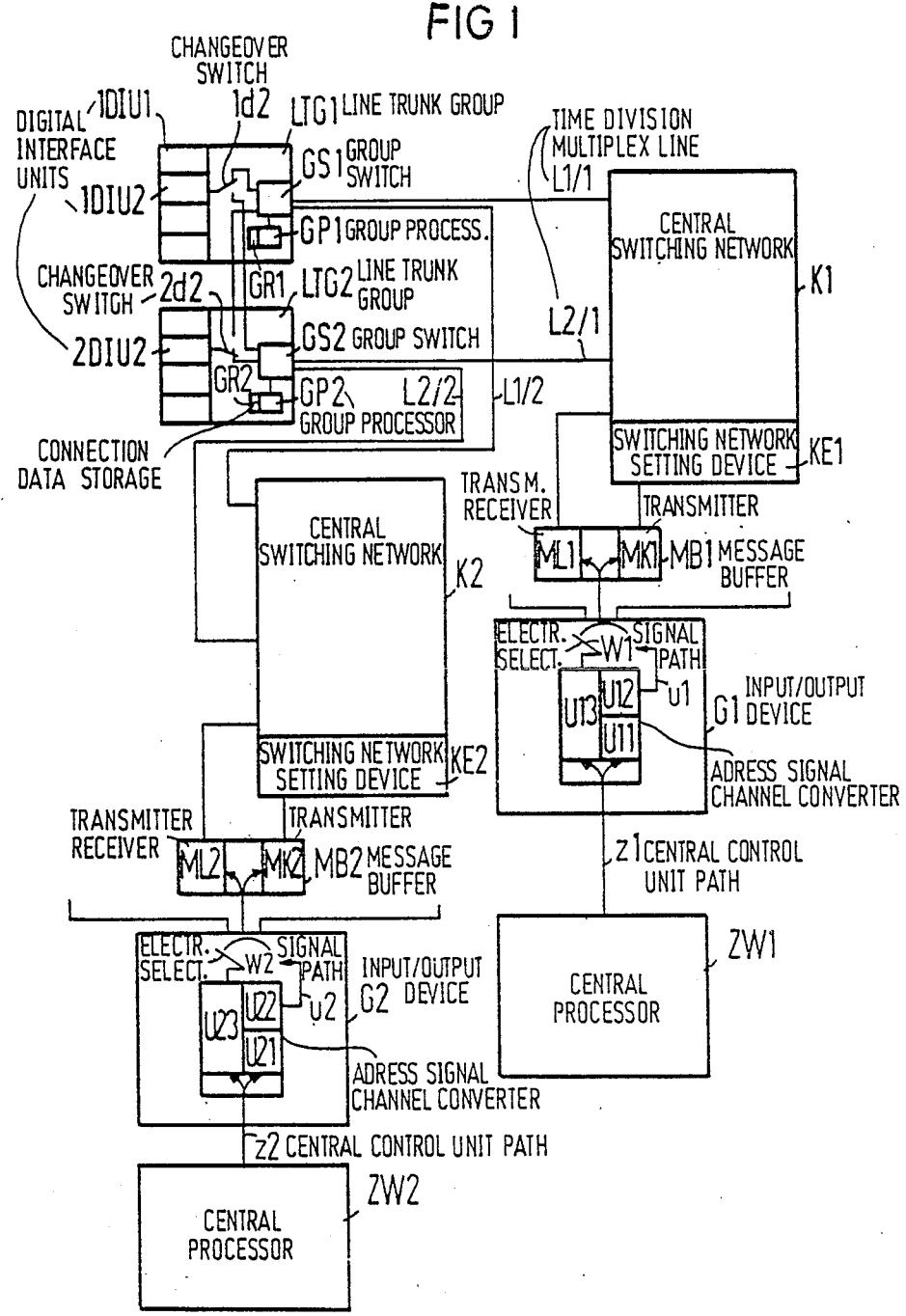
FIG. 1 shows segments of a telephone switching system of the type as is also described in German Patent No. 3 128 365.

In the drawings two line groups LTG1 and LTG2 are shown in excerpts which belong to a centrally controlled time division multiplex telephone exchange system in PCM technology according to FIG. 1. They are connected in a manner known per se via time division multiplex lines L1/1, L2/1, L1/2, and L2/2 to the multi-stage central and doubled switching network K1/K2 according to FIG. 1 which has time division multiplex inputs and time division multiplex outputs. Each of these connections, in accordance with this doubling of the switching network, is a double connection. Each of these two time division multiplex lines provided for each line group, for example LTG1, has for each of the two transmission directions a rather large number of channels, for example thirty, and is correspondingly connected to one time division multiplex input each as well as also to a time division multiplex output of each of these two switching networks.

Further, according to FIG. 1, with each of the two parallel switching networks K1/K2 a central processor ZW1 respectively ZW2 is provided, with which the entire control processes for the connection establishment are handled over the central switching network K1 respectively K2 in a manner known per se with a buffer device MB1/MK1 respectively MB2/MK2 and a switching network setting unit KE1 respectively KE2, which is described in detail in the aforementioned German Patent No. 3,128,365. To this end, data are gathered by the central processor ZW1 respectively ZW2 (central control system) from the line groups, for example LTG1 and additional ones, as well as also output in the reverse direction to them. In the process, individual control units GP1, GP2 and additional ones of the same kind in the line groups cooperate in known manner. For this data exchange the line groups and the line units addressed in them are accessed.

Of the two central switching networks K1 and K2 and the two central processors one switching network, for example K1 and a central processor, for example ZW1, are in operation at any given time while the other switching network and the other processor is available in the event a standby configuration becomes necessary. For simplification of the further general description, therefore, only the central switching network K1 and the central processor ZW1 will be mentioned.

The data to be transmitted from the central processor ZW1 to the mentioned line groups, which may also be commands for calling up data to be transmitted from the line groups LTG1, LTG2 respectively from line units 1DIU1 to 1DIU4 to the central control system, for example numerical information, are each preceded by an address identifying the particular line unit. If one line unit is to be accessed by the central processor ZW1 for the purpose of transmitting information, such as calling commands from one to the other, then it transmits the address and the information successively first to an input/output device G1 (in "telcom report": IOP). It receives both and stores them.

As is explained in the previously mentioned German Patent No. 3,128,365, data connections exist between the I/O device G1, on the one hand, and each of the line groups, and specifically their individual control units, for example GP1, GP2 on the other hand, via the time division multiplex lines L1/1 respectively L2/1, and, in particular, via one channel for each time division multiplex line, as well as via the switching network K1 and via buffer unit MB1/ML1. If the I/O device has received data along with the address from the central control system ZW1 via path z1, it supplies a first address part from this address to an address signal channel converter U11/U12. This first address part corresponds to the particular line groups and, hence to the data connection assigned to it via buffer device MB1 and switching network K1. The aforementioned converter U11/U12 outputs control information corresponding to the first address part, which it supplies via the control path u1 to an electronic selector W1 which thereby is set to the particular signal channel (running via MB1). Thereby the I/O device G1 is connected via it to the individual control unit, for example GP1, the particular line group, for example LTG1, and now transfers to it the information including the complete address, i.e. including the first address part.

A relatively large number of line groups functioning for connecting time division multiplex interexchange trunks is assigned to different traffic directions, of which the two line groups LTG1 and LTG2 are shown in excerpts. Significance, tasks, and functions of these line groups are explained very extensively in the mentioned journal, and will not be further described herein.

As already mentioned and as is also further evident in the aforementioned journal, each of the line groups contain in each instance a plurality of line units. These function in known manner to connect subscriber lines, interexchange trunks or transmission system with channels which can be occupied individually in each connection. There are different kinds of line units, for example such for analog subscriber lines, others for digital subscriber lines, others for analog interexchange trunks and similar. Likewise, there are line units which function to connect in each instance one time division multiplex interexchange trunk, which may—as is known—comprise a relatively large number of PCM channels, for example twenty-four or thirty, which can be occupied individually for each connection. As is well-known this involves precisely one channel pair for each connection with one channel each for the one transmission direction and the other transmission direction being provided.

In the aforementioned journal it is described, further, that one line unit in analog subscriber lines respectively analog interexchange trunks is provided for a plurality of lines. Line units for transmission systems operated in time division multiplex, which in each instance comprise a relatively large number of channel pairs (see above), are so designed that to one line unit a transmission system with twenty four or thirty channel pairs is connected. In the aforementioned journal it is further described that in a line group, which is equipped with line units for time division multiplex transmission systems, a total of four or five such line units are provided. Furthermore, the aforementioned journal describes that within one line group line units are connected to a time division multiplex switching unit of the particular line group ("sub switching network") and through these can be connected to channels of the time division multiplex inputs corresponding to the particular line groups and the corresponding time division multiplex output of the central switching network.

In this numerical assignment the issue is always also that the traffic loads on the different sub sections of the connection paths are optimally adapted to each other. This means practically that the number of channel pairs comprising overall the time division multiplex interexchange trunks (PCM transmission systems) connected to the line units of a line group, of which each may be assigned to another traffic direction, which, however, can also be assigned two or several in common to one and the same traffic direction, is approximately equal to the number of channel pairs which that time division multiplex line comprises which connects the particular line group to the central switching network. Thus, the transmission systems 1u1 to 1u4 shown in FIG. 2 may have the same number of channel pairs as the time division multiplex line L1/1.

Since it may happen that the individual control units (GP), sub switching networks (GS) or time division multiplex lines can fail due to breakdown, which, hence, also applies for the time division multiplex lines L1/1, L1/2, L2/1, and L2/2, this would bring about that also the time division multiplex transmission systems, which are connected to the line units of the particular line group, likewise all are no longer available for establishing a connection. Since in switching technology, given the values and data regarding the numbers of channel pairs for each traffic direction, frequently only a single transmission system for each traffic direction need to be provided, in the event of failure of an individual control unit, a sub switching network or a time division multiplex line connecting a line group with the central switching network, the particular sole transmission system for each traffic direction would fail. The same applies in the event of failure of the individual control unit, for example GP1, a line group, for example LTG1.

One such disadvantage is eliminated in that two line groups are assigned in pairs to each other. What applies in this regard for the two line groups LTG1 and LTG2, shown in the drawing in excerpts, applies equally well for all further line groups with line systems, to which PCM transmission systems are connected in the indicated manner. It is, furthermore, provided that the line systems 1DIU1 to 1DIU4 and 2DIU1 to 2DIU4 of each of these two line groups LTG1 and LTG2, which are in normal operation connected to the time division multiplex switching system GS1 respectively GS2 of their own line group LTG1 respectively LTG2, during emergency operation of one of these two line groups, for example LTG2, can be switched over to one time division multiplex switching system forming a sub-switching network, for example GS1, of the (in each instance) other line groups, for example LTG1. To this end, changeover switches 1d1 to 1d4 and 2d1 to 2d4 are provided. These are shown in the drawing in a rest position corresponding to normal operation. Upon changing from normal operation to emergency operation they are switched from their shown rest position to their operating position. A situation of emergency operation exists, if in a line group a failure due to disturbance of the above indicated kind occurs.

If now changeover switch 2d1 to 2d4 when changing from normal operation to emergency operation due to breakdown are switched from their shown rest position to their operating position, then from then on the line units 2DIU1 to 2DIU4 of the line group LTG2 are connected to the time division multiplex switching system GS1 of the line group LTG1. Consequently, in the event of a failure of the time division multiplex line L2/1 the PCM transmission systems 2u1 to 2u4 can be continued to be operated with their channels which can be occupied individually with each connection. Each of these PCM transmission systems can be assigned singly to a traffic direction. But it is also possible for two or more PCM transmission systems to be assigned to a traffic direction, which means, they can also form a common trunk group of channel pairs. Particular significance in the connections treated here assumes the case in which for one traffic direction only one single PCM transmission system with the particular number of channel pairs is provided.

As already mentioned, the connections are put through the central switching network K1. Here, the central processor ZW1 cooperates. In the central processor the line groups, the line units contained within them as well as the channel pairs led through each of them, are accessible through addresses. It can be provided that each of the line units is accessible with the aid of a normal operation address as well as also with the aid of an emergency operation address from the central processor. These normal operation addresses and emergency operation addresses are, thus, usable depending on the particular operational requirements. Hence, it is provided that the line units, which are wired with PCM transmission systems can be accessed from the central processor with one normal operation address and one emergency operation address, and that in the event of an operations failure in a line group, for example LTG2, respectively its group control unit, for example GP2, the emergency operation addresses of the particular line units, for example 2DIU1 to 2DIU4 which are blocked in the central processor during normal operation are enabled and, instead, the normal operation addresses of these line units are blocked. In a manner not shown in detail, thus, the central processor is informed that a line group, for example LTG2, changes from normal operation to emergency operation. Due to this message the central processor undertakes the previously indicated process of enabling the emergency operation addresses of the particular line units as well as blocking of the normal operation addresses of these line units. This applies in the same way also for access addresses of the channel pairs led through the particular line units. In this connection it is, furthermore, provided that the line units, for example 2DIU1 to 2DIU4 are accessible from the central processor with the normal operation address via its associated line group, for example LTG2, directly and with the emergency operation address via the other line group, for example LTG1.

In the same manner as the aforementioned changeover switching of the connecting paths (the entire channel pairs) with the alter switches 2d1 to 2d4, the central clock supply of the particular line units is switched over in the transition from normal operation to emergency operation from the associated line group to the other line group. This ensures that the line units run clock-synchronously with that line group to which the particular switching took place. In the same manner supply with the required operating voltage for the particular line units of those line groups which transited from normal to emergency operation can be switched over to the other line group. It is still more favorable to provide redundant units for the operating voltage supply, which means failure-safe, for example double for all line units of the two line groups.

In partial deviation from the previous description it can also be provided that the line units can be accessed from the central processor via signal channels assigned to the line groups with an address which comprises a first address part identifying the particular line group and a second address part identifying the particular line unit within it. With the first address part of the address of the particular line unit in each instance that line group is accessed, to which the particular line unit belongs. Accessing the line group takes place in the indicated manner in that in conjunction with the first address part a setting information is formed in the address signal converter U11/U12, which is supplied via control path u to the electronic selector W1 whereby the I/O device G1 is connected via the buffer device MB1 with that signal channel which is standing by via the switching network K1 in through-connected state, which via a time division multiplex line, for example L1/1 leads to the particular line group. Thus, an address signal channel converter G1 is provided in the central processor which in the presence of information for a line unit outputs on the basis of the address included with the information in conjunction with its first address part a signal channel number utilized by the processor for accessing the particular signal channel. This signal channel number functions as setting information which is transferred via the signal path u 1 to the mentioned electronic selector W1 for its setting to the particular signal channel. This electronic selector can be formed in any given was as coupler.—The address signal channel converter G1 in the central processor ZW1 can, of course, also be provided spatially separated from it (as shown in FIG. 1), but can also be component part of it. It functions in a manner known per se for handling the input and output procedures of the central processor ZW1 (IOP in "telcom report").

As has already been explained, in the particular access of a signal channel for the purpose of accessing the particular line group the mentioned address as well as the information is transmitted through this signal channel. Address and information are transmitted through the signal channel to the particular line group and here via the mentioned time division multiplex switching system, for example GS1, first to the particular individual control device, for example GP1. The latter recognizes on the basis of the address and, specifically, in particular of the second address part contained in it to which of the line units the particular information needs to be transferred.

In the previously described connection it may initially be assumed that the first address part mentioned already further on up identifies that line group to which address and information were transmitted in the previously described manner. The second address part now indicates which of the line units within the particular line group, for example LTG1, is the one to which the particular information needs to be supplied. It may be assumed, that this is the line unit 1DIU2. Furthermore, it may be assumed that the particular line group, for example LTG1 is in normal operating state. In this case, the changeover switch 1d2 is in the rest position shown in FIG. 1. The line unit 1DIU2 is, consequently, in this operating state connected via the break side of the switch 1d2 to the time division multiplex switching unit GS1 of the line group LTG1.

As aforementioned, the individual control device GP1 has received together with the information which is intended for the line unit 1DIU2 also the address and has placed it in intermediate storage, which comprises a first address part identifying the line group LTG1 and a second identifying the line unit 1DIU2 within it. On the basis of the first address part the individual control unit GP1 recognizes that the particular information is to be transferred to a line unit, which belongs to the same line group LTG1. On the basis of the second address part the individual control unit recognizes that the data are to be passed on to the line unit 1DIU2. Based on this the individual control unit GP1 drives the time division multiplex switching system GS1 in such a way that a transmission path from the individual control unit GP1 to the line unit 1DIU2 is through-connected which, hence, runs via the break side of the changeover switch 1d2.

In a modification, it can also be provided that the individual control unit GP1 in the indicated connection also does not receive the data with the particular address but only the address itself, and that it in conjunction with it through-connects a direct transmission path for the data from the signal channel extending via the time division multiplex line L1/1 via the time division multiplex switching system GS1 and the break side of the changeover switch 1d2 to the line system 1DIU2. In this case the address is received via the signal channel in the individual control unit GP1 and here utilized for through-connecting a direct path from the mentioned signal channel to the particular line unit. In this case, thus, placing the particular information into intermediate storage in the individual control unit GP1 would become unnecessary.

In this connection the specific emergency operation should be explained. A situation of emergency operation due to failure can be caused in that the signal channel between a line group and the central processor is not utilizable, or that the individual control unit, for example GP2, and/or the time division multiplex switching system, for example GS1, of the particular line group does not have the requisite functional capability. This is recognizable for the central processor on the basis of a monitoring process which is continually carried out, which is described specifically in the already mentioned journal "telcom report", as well as in the German patent application No. 3,106,903. If the central processor detects an operation failure which affects, for example the line group LTG2, then the entire subsequent data exchange between central processor ZW1 and the line units 2DIU1 to 2DIU4 of the line group LTG2 affected by the operation breakdown takes place for the duration of the operation disturbance by way of line group LTG1. To this end all alter switches in the affected line group LTG2 are brought from their rest position into their operating position in a manner described in still greater detail further down. This can occur in a way that initially the operating breakdown which took place within the affected line group is itself detected or that the central processor ZW1 detects the operating disturbance affecting line group LTG2; it transmits then appropriate information regarding it to the individual control unit GP1 of the line group LTG1 assigned in pairs, whereupon it outputs commands for actuating the mentioned four changeover switches in the line group LTG2 to it.

Upon occurrence of an operating breakdown affecting the line group LTG2 the changeover switches 2d1 to 2d4 are actuated. Correspondingly, the line units 2DIU 1 to 2 DIU4 are connected with the time division multiplex switching system GS1 of line group LTG1. This switching takes place—as will be explained further down more specifically—in a manner according to the invention which is individual to the connection.

If the central processor ZW1 detects the functional failure relating to the operation breakdown of line group LTG2, hence, if it detects that further data exchange with the corresponding line units 2DIU1 to 2DIU4 is to be handled through the signal channel of line group LTG1, it supplies a corresponding message also to the address signal converter U11/U12 in the I/O device G1. Through this message the signal channel number relating to line units 2DIU1 to 2DIU4 in line group LTG2 is temporarily changed. This means practically that for the duration of the operation breakdown of line group LTG2 when processing one of its line units the address signal channel converter upon receiving an address with a first address part identifying the line group LTG2 outputs control information via the control path $\mu$l to the electronic selector W1, which brings about that in this case, instead of the signal channel of the line group LTG2, rather the signal channel of line group LTG1 is accessed by the electronic selector W1. The central processor, hence, for accessing a line unit 2DIU1 to 2DIU4 during a state of operation breakdown outputs the address and the information for the particular line group just as in the state of normal operation of line group LTG2. In the address signal channel converter U11/U12 for the duration of the operation breakdown of line group LTG2 is retained that instead of its signal channel rather the signal channel of line group LTG1 is to be accessed. The diversion of the information regarding the operation breakdown of line group LTG2 for its line units takes place in the I/O device with the aid of the electronic selector W1 on the basis of the temporary change of the signal channel number stored in the address signal channel converter U11/U12, which is called up as control information from case to case and supplied for control of selector W1.

Operating situations can also arise in which in the central processor the actual instantaneous assignment of an interexchange trunk—respectively a corresponding channel—connected on the outside to a line unit to a given line group is not definitely recognized, for example during a diversion phase. For this case is provided to transmit a particular message and, specifically, one and the same message from the central processor simultaneously to the two particular line groups (LTG1 and LTG2) and, specifically, in each instance addressed in the already indicated manner. This assignment, however, is known in the line groups. That line group to which this interexchange trunk is assigned transfers this information in the described manner. Beyond that, it is provided that the other line group in which is detected that a message for an interexchange trunk has been received from the central processor, which at this time is not assigned to this line group, it is determined as being irrelevant and therefore rejected. This information is, therefore, not passed from this other line group to a line unit but deleted.

If information along with address belonging to it and consisting of a first address part and a second address part is sent due to a breakdown to line group LTG1, even though the particular information is intended for one of line units 2DIU1 to 2DIU4, then the individual control unit GP1 recognizes on the basis of the first address part initially that the particular information is intended for a line unit of the other line group. On the basis of the second address part this individual control unit recognized the particular line unit for which the information is intended. Due to the first address part and due to the second address part the individual control unit GP1 carries the particular information to that line unit of the other line group LTG2 for which it is intended. To this end, the individual control unit GP1 through-connects a transmission path via the time division multiplex switching system GS1 over which the information is subsequently transmitted. This takes place via a corresponding connection of the time division multiplex switching system GS1 and the make side of the particular changeover switch, for example 2d2. In this case, too, the particular information can be temporarily stored in the individual control unit GP1 and subsequently be transmitted from it to the particular line unit, for example 2DIU2, or it can be provided in the above described manner that in the here described operating case a direct path can also be through-connected from the signal channel extending via the time division multiplex line L1/1 via the time division multiplex switching system GS1 and via the changeover switch 2d2 in the operating position to the line system 2DIU2.

In the manner described information can be transmitted from the central processor to each of the line units as well as also in the reverse direction. In the latter case the information transmitted from the central processor to the particular line unit may be call-up information on the basis of which in the reverse direction the information to be transmitted and called up is transmitted from the particular line system to the central processor. Similarly, the data transmission from line group to line group can take place as is described in the German Patent No. 3,128,365. In this way data can be transmitted from a line unit of a line group to a line unit of another line group and these data do not need to be received by the central processor ZW1 itself, but, after arriving from a line unit in the I/O device G1, are transmitted from here directly to the particular line system for which they are intended. This is possible through transferring the data within the I/O device G1 described in the last mentioned Patent.

Before the details of the invention of the described changeover switches are explained in greater detail, the specification will first describe to the process of doubling the processor and central switching network. As is evident in the part of the specification up to now a central switching network K1/K2 functioning for through-connecting is provided in duplicate. Likewise, a central processor ZW1/ZW2 is provided in duplicate, with the one switching network, for example K1 and the one central processor, for example ZW2, being assigned to each other, which also applies to the other switching network and the other central processor. The central processor functions in a known manner to control its central switching network as well as for the switching signal processing necessary for this purpose. Each of the two processors is program-driven in a known manner. Doubling the switching network and central processor functions in known manner for standby operation. In the event of a functional breakdown and/or a switching error in one of the two switching networks and/or in one of the two central processors and/or in one of the additional groups assigned to them the possibility exists, as is known, that the switching operation instead of with the one central switching network, for example K1, and the one of the two central processor, for example ZW1, is continued rather with the other of the two switching networks, for example K2, and the other of the two central processors, for example ZW2—and vice versa.

A plurality of individual line groups is equipped with one partial switching network for outside connection of interexchange trunks and/or subscriber lines, respectively corresponding channels, and with one individual programmable control unit for switching signal reception by these lines, for switching signal preprocessing and for transferring switching signals to the particular central processor and for switching signal transmission to the mentioned lines respectively channels. Thus, line group LTG1 has the partial switching network GS1 and the individual control device GP1. To the partial switching network GS1 the devices 1DIU1 to 1DIU4 are connected on the outside which were already mentioned further up. On the inside the two time division multiplex lines L1/1 and L1/2 (also called "link lines") are connected to the partial switching network, which lead to the two central switching networks K1 and K2. Each of these time division multiplex line comprises—as already likewise explained hereinbefore—a number of, for example thirty—channel pairs, with one channel pair containing a transmission channel in the one transmission direction and one transmission channel in the other transmission direction. Each of these channel pairs forms a link line. Consequently, each partial switching network, for example GS1, is group-wise separated via two groups of link lines connected to switching network connections, on the one hand, of the one and, on the other hand, of the other of the two switching networks provided parallel.

For a data exchange functioning for switching signal processing between the individual control units, and the particular processors ready to operate, data connections are brought into a ready state respectively are maintained in this state. The point of this switching signal processing is that pulse data supplied by the subscribers as well as switching signals arriving via already established or partially established connections paths which arrive via the individual line groups are supplied to the particular central processor following preprocessing in the particular individual control unit, through which it derives setting information for its central switching network and control information as well as switching signals which are conducted again to the particular individual control system. These switching signals are transmitted via the particular connections, and control data function to switch on audio sound signals, calling signals and similar for the particular subscribers. The data exchange between each of the individual control systems, and the particular central processor, functioning for this switching signal processing, takes place via data connections which are established between each of the individual control units, via the particular central switching network which is in operation any given time with the particular processor in operation and are kept continually in a ready state. These data connections are established similarly to communication links via the central switching network. They extend in a manner already indicated via the devices MB1 and G1 if at the time the switching network K1 and the central processor ZW1 are in operation.

The mentioned data links between each of the individual control units of each of the line groups, on the one hand, and the central processor which is in operation at that time function not only for the indicated data exchange carried out for handling the mentioned switching signal treatment but these data links also function for the purpose that when a central processor assumes operation and the central switching network assigned to this central processor transmits program and switching software to all individual control units of all line groups. This is also referred to as "loading" and is described extensively in the aforementioned journal "telcom report", supplement 1981, in particular at page 19. To this end is provided in the case of the described embodiment an I/O device, for example, G1 connected to the central processor, for example, ZW1, to which several data buffer storage devices, for example, MB1 are connected; from each of these a plurality of data links leads via the particular switching network, for example, K1, to the individual control units of the mentioned line groups. These data buffer storage devices are firmly connected singly with link connections to terminals of the switching network. As was already explained such connection and, correspondingly, also a link connection is realized through a channel pair. The channel pairs are associated with the time division multiplex lines connected to the switching network K1 respectively K2.

The data regarding techniques of switching which are required for switching operation and which are to be stored in the individual control units such as subscriber terminal location-subscriber call number-assignment, subscriber enable and technical features of connected interexchange trunks and similar as well as program information which is decisive for the handling of the switching functions, are initially input into corresponding storage devices of the two central processors and are transmitted from here upon a central processor assuming operation to the individual control units of the different line groups and stored here. This transmission and storage takes place individually for each line group. That means individually for the individual control units of the different line groups in succession. The time required for this when utilizing an exchange is negligibly small compared to the total amount of work required in connection with establishing an exchange. This required time, however, carries greater weight in the case of standby switching of the central processor and the central switching network. In that event it is also intended to load anew the individual control units of the line groups with the switching information (subscriber line software) and/or program information stored in the central processor. This ensures, for example, with certainty complete identity respectively complete correspondence for the cooperation of processor and control unit regarding this information, which, thus, is stored in the central processor which is newly going into operation and in the individual control units Hereby any deviations are eliminated which otherwise could originate regarding this switching information and/or this program information, which, are stored in the central processor commencing operation and, in the individual control units of each of the different line groups. Such deviations could arise due to errors or due to failures or also, in the interim intentional changes of this switching information and/or program information. By renewed loading of all individual control units with the program data and the switching data by the central processor, which in connection with the provided replacement switching is in the process of going into operation, such deviations are eliminated with certainty; equally, in this manner intentional changes regarding this information and program data can be carried out.

It is not only to avoid failure of a traffic direction given by a PCM transmission system (as described above) but also the additional purpose, specifically to shorten the process of the described loading of the program data and the switching information from the central processor which is in the process of taking up operation anew in connection with a provided changeover to standby respectively from its particular storage device into the individual control units of the different line groups that the already mentioned measure functions that two line groups each are assigned to each other in pairs and that in each of them line units functioning for the outside connection of subscriber and/or interexchange trunks and within the particular line group connected with its sub switching network in normal operation in the event of emergency operation or in quasi-emergency operation (preparation for a processor changeover to standby) can be changed over in the described manner. Hence, use is made of the technical method where the described changeover from normal operation to emergency operation can be initiated not only with a pair of line groups but (in quasi-emergency operation for preparation to a processor changeover) also with all line groups. In the process the line units of one of two line groups assigned pairwise to each other are additionally connected to the sub switching network of the other, thus partner line groups, which takes place equally for all line groups assigned pairwise to each other. Further, for the connections running via the changed over line units the corresponding switching signal processing as well as setting of the sub switching network is also carried out by the individual control units of the partner line groups.

In this operating mode, within two line groups assigned pairwise to each other, the individual control unit of only one of them handles all line units, such as for example subscriber line circuits, multiple subscriber line circuits, interexchange trunk terminal circuits, which may also be interexchange trunk multiple terminal circuits and similar. All connections, too, which are established via the line units of both line groups, are through-connected via the sub switching network of only the one of the two line groups by this one control unit. Assuming that in this operating mode the line units of the one of these two line groups are connected to the sub switching network of the other line group, the entire formation of the connection, thus, takes place via the sub switching network of the latter line group with the aid of its individual control unit. The two line groups, however, are actually entirely equivalent. That means this changeover can, with respect to these two line groups, also take place in reverse. The entire further operation takes then place in the same manner as in the emergency operation mode which had earlier been described in detail. In this operating mode all line groups operate equally in emergency operation.

After bringing about the state of emergency operation, one half of all individual control units are withdrawn from switching operation, as also one half of all sub switching networks, and, specifically, one individual control unit and the sub switching network for each pair of line groups assigned to it.

Changing over to standby of one of the two central processors by the (in each instance) other central processor it prepared while the central processor which was in operation until then initially still continues to operate in that all line groups assigned pairwise to each other are converted from normal to emergency operation; further, the other central processor establishes data links via the other central switching network associated with it to the individual control units of all first line groups. These connections are put through to the individual control units of all those line groups whose line units were switched over to the sub switching network of the other line unit assigned pairwise, thus, those line groups whose individual control units and whose sub switching networks were withdrawn from normal switching operation in connection which the changeover to standby in preparation.

Via the aforementioned newly established data links the central processor newly entering operation in connection with the impending changeover to standby loads the entire switching data into the particular individual control units respectively into their corresponding storage devices. This central processor transfers, subsequently, sequentially to the particular individual control units, which at this time have been withdrawn from regular switching operation, the program and switching software required for their renewed operation begin for the purpose of storing it in them. This takes place by the central processor commencing operation in connection with the impending changeover to standby already preparatorily during a transition time in which the other central processor still continues the switching operation with those individual control units and sub switching network, which have been changed from normal to emergency operation for this purpose, for the purpose of preparation of the intended changeover. Once the previously described processes of loading program information and switching information which prepare for a processor changeover to standby operation are completed, the changeover to standby operation takes place. In this process, in a manner known per se the totality of the central data processing and control functions is transferred from the one central processor to the other central processor and the one central switching network is also replaced by the other central switching network. The changeover switches LHl and LHL are actuated, that is they are brought from their shown rest position to their operating position whereby the changeover from the one central switching network to the other is accomplished. It may also be provided that already existing connection remain until their release. All new connections are then established with the newly loaded individual control units, and, specifically, through the sub switching networks corresponding to them. The other individual control units and the sub switching networks assigned to them are temporarily not used to establish further connections.

Figure 2:
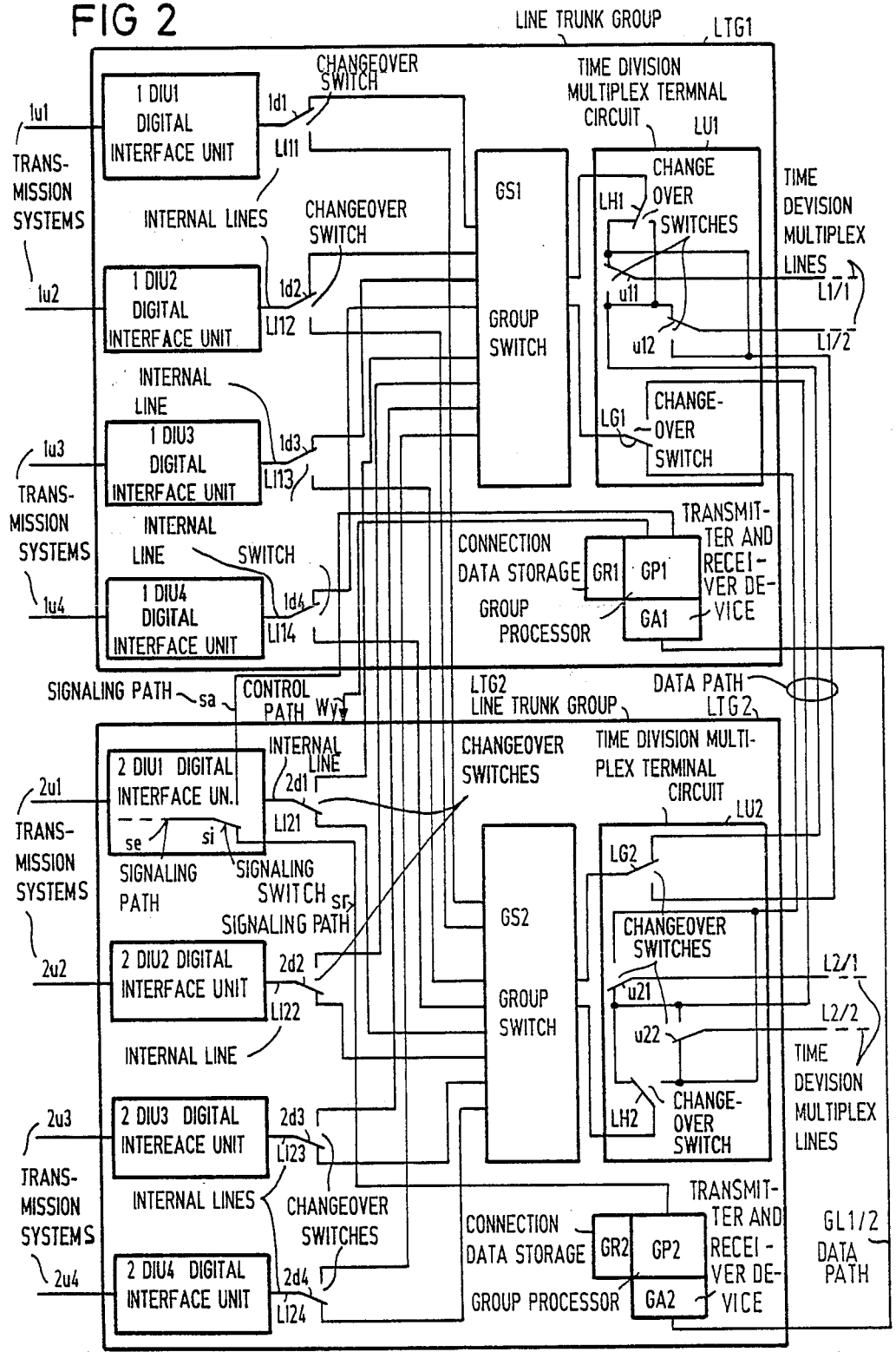
FIG. 2 shows FIG. 1 as modified in accordance with the present invention.

In this connection, namely completing the changeover to standby, further a renewed changeover takes place within the line groups and, specifically, now within all line groups with the aid of the changeover contacts 1d1 to 2d4 shown in FIG. 2. Of these the changeover switches 2d1 to 2d4 which—as described above—at the beginning of the emergency operation had been brought from their rest position into their operating position, now return to their rest position, whereas the changeover switches ld1 to ld4 are brought from their rest position into the operating position. Subsequently, the switching operation is also continued with the help of those individual control units which up to the completed changeover to standby had been withdrawn from normal switching operation as well as via the assigned sub switching network. Those individual control units and assigned sub switching networks which up to the time of changeover to standby had continued the switching operation in emergency or quasi emergency mode, then first become inoperative. But then that central processor which in connection with the changeover to standby became operative establishes successively data links to all these individual control units which at the time of the completed changeover stopped operating first. Subsequently, the central processor loads the requisite program data and switching data also into the storage devices of these individual control units. This takes place dispersed in time in the normal switching processes. After the individual processor has loaded all of these individual control units with the required program information and the particular switching information, the mode in the line groups assigned to each other in pairs is successively again brought back from emergency to normal operation in that now also the changeover switches 1d1 to 1d4 are set back to their rest position.

The already described changeovers to standby are carried out with the changeover switches 1d1 to 4d2 (and alternatively with the changeover switches u11 to u22). These changeovers can serve the purpose of avoiding the failure of a traffic direction in the event that of one PCM transmission system representing a traffic direction none of its channels—due to a breakdown in the particular line groups—can be seized. In this case the changeover can be limited to a single pair of line groups assigned to each other. These changeovers, however, can also with respect to the number of participating line groups be of greater extent, in particular affect all line groups. This applies preferentially for the processor changeover switching case.

As has already been explained for the preparation of a changeover to standby process is provided that of by that central processor, for example, the central processor ZW2, which in the changeover to standby process takes over the central processor functions instead of the other central processor, for example ZW1, via the central switching network, for example K2, assigned to the central processor taking over these functions, for example ZW2, data links to the indicual control units, for example GP2, of all those line groups, for example LTG2 are individually connected through, thus are brought into a ready state, in which with the aid of the changeover switches, for example 2d1 to 2d4 the associated line units, for example 2DIU1 to 2DIU4, were changed over from sub switching network, for example GS2, of this line group, for example LTG2 to sub switching network, for example GS1, of the other line group, for example LTG1. Such changeover can be carried out in preparation for emergency operation due to breakdowns of the kind described further up, thus solely for only one single line group pair (LTG1/LTG2) but it can also be carried out for the totality of the present pairs of line groups and, specifically, for the purpose of preparing the previously already extensively described changeover to standby of one of the central processors by the (in each instance) other central processor. As was also explained already in such changeover to standby, the changeover switches LH1, LH2, LG1, and LG2 are actuated. If the central processor ZW1 is operating, these changeover switches are in the position shown in FIG. 2. If the central processor ZW2 is in operation, in connection herewith the last mentioned changeover switches are brought into their other switching position. The sub switching networks GS1 and GS2 instead of with the central switching network K1 are connected to the central switching network K2.

The described changeover can also affect line units, for example 2DIU1 to 2DIU4, of a line group, for example LTG2, in whose sub switching network, for example GS2, or individual control system, for example GP2, or at any other location an operating failure has occurred, but can also affect all line groups in the event of processor changeover to standby. This changeover affects the connection paths, which in the Figure are denoted by Li11 to Li24, between the line units and the outside sub switching network terminals. This changeover can also be provided for the inside sub-switching network connections. In connection with such changeover, first with the changeover switches u11, u12, u21, and u22 also the connections between the sub switching networks GS1 and GS2, and the time division multiplex lines L1/1 to L2/2, are changed over in a manner shown in the drawing. These changeover switches are shown in FIG. 2 in that switching position which they assume in normal operation. If the changeover switches 2d1 to 2d4 are actuated and they separate the line units 2DIU1 to 2DIU4 from the external connections of the sub-switching network GS2 and connect to the external connections of sub switching network GS1, changeover switches u21 and u22 are also provided for the previously mentioned case that for the internal switching network connections a changeover is provided. They are then also actuated in line group LTG2. Thereby of the time division multiplex lines L2/1 and L2/2 which lead to the line group LTG2, the time division multiplex line, for example L2/1 in the time division multiplex terminal circuit LU2 belonging to this line group leading to the processor, for example ZW1 in operation at this time, is changed over with the effect that this time division multiplex line (L@/1) now instead of to sub switching network GS2 (via u21 break side and LH2 break side) is connected to sub switching network GS1 (via u21 make side and LH1 break side), with it being determined in this operating case with the additional changeover switches LG1 whether or not this changed over connection becomes effective as a time division multiplex connection to the central switching network K1 or to the central switching network K2, in the just now addressed operation situation, thus, a connection to the central switching network K1. If a sub-switching network is changed over, this affects its external sub switching network connections as well as also—in the case of the above described example—its internal sub switching network connections. Through a changeover in a line groups, for example LTG2, accordingly, its line units, for example 2DIU1 to 2DIU4, as well as also its time division multiplex subscriber lines, for example L2/1 and L2/2 are changed over by the sub switching network, for example GS2, of the particular line group, for example LTG2, to the sub switching network, for example GS1, of the particular partner line group, for example LTG1. This changeover can, in the event of a breakdown, for the purpose of rendering ineffective the particular disturbance, be undertaken in a single line group pair of one of its two line groups or likewise in the case of several line groups affected by breakdowns, or for the purpose of preparing the above processor changeover to standby also simultaneously in all pairs of line groups. However, the possibility also exists of forming the telephone exchange installation in such a way that changing over affects only the line systems thus only their connection with the sub switching network of their own line group or that of the particular partner line groups but not the connections of the internal sub switching network connection to the time division multiplex subscriber lines L1/1 to L2/2. In this case the traffic which is handled via the partially changed over line systems, for example 2DIU1 to 2DIU4, is conducted additionally via the time division multiplex subscriber lines, for example L1/1 of that line group, for example LTG1, to whose sub switching network, for example GS1, this changeover took place. In this case it is best to proportion the time division multiplex subscriber lines as well as the sub switching networks with respect to number of channels and through-connection possibilities so that the traffic which for a line group has been added in addition due to the changeover can be handled. If the changeover—as described before and shown in FIG. 2 also affects the time division multiplex subscriber lines L1/1 to L2/2, it is advisable to proportion the sub switching networks so that within them sufficient through-connection path are present, i.e. also in the situation in which changeover operation occurs.

As is further evident in FIGS. 1 and 2 of the drawing, that to each of the individual control units GP1 and GP2 one connection data storage GR1 and GR2 is individually assigned. Furthermore, to each of these control units one transmitter and receiver device GA1 respectively GA2 is individually assigned. These are connected to each other via an individual data transmission path GL1/2. Via it the two individual control units can transmit to each other connection data with the mentioned transmitter and receiver devices. These can additionally also have the function of an intermediate storage in connection with the particular transmission processes.

It is now provided that each of the individual control units stores in its connection data storage device connection data regarding each existing connection through-connected from subscriber station to subscriber station. It can also be provided that also connection data of such connections are stored which are still in the state of establishing the connection, or also only such connections which have already been through-connected from subscriber station to subscriber station, in which the called party, however, has not yet answered.

The connection data, which are stored in the connection data storage devices, indicate with respect to the individual connection existing via the assigned sub switching network which external sub switching network line is connected with which internal sub switching network line. The "assigned" sub switching network is always that network which belongs to the same line group as the particular individual control unit and its connection data storage. Since a connection through-connected from one subscriber station to another subscriber station always runs through one sub switching network, also the particular central switching network and again a sub switching network, then to one connection through-connected from one subscriber station to another subscriber stations always belong two connections in each instance within one or one each sub switching network. These connections can also be referred to as "sub-connections". It is, thus, provided that in normal switching operation in each line group the connection data of those connections are stored which run through the particular sub switching network.

It can be provided that the individual control units which belong to a pair of line groups transmit to each other the connection data all newly through-connected connections. The connection data of all connections which are through-connected, for example via the sub switching network GS2, are then transmitted by the individual control unit GP2 from its connection data storage GR2 to the individual control unit GP1 and conversely. The latter now stores the connection data received from its partner control unit also in its particular connection data storage and, furthermore, switches each individual control unit on the basis of the connection data received from its partner control unit additional connections ("sub connections") within that sub switching network which along with it belongs to the same line group.

Provisions can be made in this connection that the connection data are transmitted from each of the two individual control units in the current switching operation to the particular partner control unit and that each of the two individual control units due to these connection data establishes continuously the particular sub connections. It can also be provided, that each of the two individual control units by itself initially only stores the connection data relating to the particular assigned sub switching network, and that these are transmitted from each of the two individual control units in each instance only on the basis of a changeover preparation signal to its partner control unit, and that each of the two individual control units due to this stored transmitted connection data establishes the particular sub-connections. Similarly, it can also be provided that each of the two individual control units by itself stores the connection data relating to the sub switching network assigned to it, and that these are continuously transmitted from each of the two individual control units in each instance to its partner control unit and that each of the two individual control units, due to these stored transmitted connection data and due to a changeover preparation signal establishes the particular sub-connection.

In this manner in normal switching operation in each sub switching network those connections can be through-connected via which connections through-connected from subscriber station to subscriber station, via which the particular subscribers communicated, are led, as well as also those connection between external and internal sub switching network connections which in normal switching operation are still unused. These connections extend from external sub switching network connections, for example of the sub switching network GS1 which are connected in the other line group, for example LTG2, via internal lines, for example Li, to the make sides of the particular changeover switches, for example 2d1 to 2d4, to internal sub switching network connections which are connected via the changeover switches LG1 respectively LG2 to the make sides of changeover switches u21 and u22 respectively u11 and u12. All of these changeover switches are preferably designed as electronically operating switches in known manner.

If from a line group the individual control unit and the sub-switching network is taken out of operation, then in the course of the changeover bringing this about the line units of the line group, for example 2DIU1 to 2DIU4, and possibly also the time division multiplex subscriber lines, for example L2/1 and L2/2 which lead from this line group to the central (duplicated) switching network are changed over with the described changeover switch for example 2d1 to 2d4 and possibly also u21 and u22 to the sub switching network of the particular partner line group. Since in this connection it is provided that between external and internal sub-switching network connections the sub-switching network connections ("sub connections") which up to this time were unused, are established preparatorily, it is thus achieved that in the course of a changeover of the aforementioned kind of connections which are already through-connected from subscriber station to subscriber station and do not need to be disconnected. To this end, in normal switching operation from each of the two individual control units, which belong to a pair of line groups, via individual transmission paths specific to the pairs of line groups connection data are transmitted to the corresponding partner control unit. Each of the two individual control units establishes on the basis of these transmitted connection data received by it connections via the sub-switching network of the assigned line group, and, specifically to the external sub switching network connection with which upon a changeover the line units of a first line group can be connected to the sub switching network of a second line group of the particular partner line group through the changeover to standby.

The features essential to the embodiment described herein relate to the various processes of changeover to standby of the line system of a line group or—as explained—a plurality of line groups, in particular each second line group. It is of particular significance to the invention that connections which are in the process of being established which are affected by a changeover do not need to be disconnected. This process of establishing extends all the way from the time the handset is taken off at the subscriber station of a calling subscriber (closing the particular subscriber line loop) to the point at which the called party answers. Since in this process of establishing a connection the sub control systems of the line groups through which the new connection runs as well as the central processor participate, and since between these different data exchange and control processes run, they may not be disturbed in any changeover. Therefore, the invention provides that the internal lines, for example, Li11, within a line group, for example LTG1, to its sub switching network, for example GS1, can be changed over within one diversion phase singly, i.e. specific to the connection to the sub-switching network, for example GS2, of the (in each instance) other line group, for example LTG2. To this end, the changeover switches 1d1 to 2d4 are formed as electronically operating switches.

The lines L1/1 to L2/2 are time division multiplex subscriber lines. The present invention, however, is not limited to this, but is also applicable to a telephone exchange in which all lines and all through-connect paths in the sub-switching networks, for example GS1, as well as in the central switching network, for example K1, have been realized according to the principle of space division. Since —as indicated above—the invention provides that the internal lines Li11 to Li24 within a line group leading from a line system within a line group to its sub switching network can be changed over within a diversion phase singly, i.e. specific to the connection to the sub-switching network of the other line group this refers to the last mentioned application as well as also to the applicants wherein the exchange is realized in TDM PCM technology. Thus, what was stated according to the invention with respect to the internal lines applies for internal lines specific to the connecting according to the space division multiplex principle as well as in corresponding manner for time division multiplex channels, which lead always with several in common via one and the same transmission path, hence, have a common transmission medium. In the latter case the changeover switches 1d1 to 2d4 and the changeover switches u11 to u22 function according to the time division multiplex principle, in which they in know manner either change over each of the particular channels singly or first still leave unchanged and vice versa. These changeover switches are driven in a manner known per se by the sub control system of that line group from which or to which the intended changeover takes place. It is provided that this changeover takes place individual to the channel that the changeover switches are driven channel-individually according to the time division multiplex principle.

It is provided that within this diversion phase carrying out changeovers is restricted to those internal lines which are not busy, respectively which are becoming free, for example through connection release, preferentially to these as well as additionally such internal lines, in which the processes of establishing connection have been completed, the same called party, however, has not yet answered. This avoids that changeovers in connections take place in their particular build-up phase. Here, the possibility exists of restricting the changeovers generally completely to the unseized internal lines. Such operating mechanism brings about that in addition to connections in the process of being established also those already completely through-connected remain untouched from changeovers. In this case the entire process of changeover switching extends to a changeover phase which runs up to a point at which also the last connection which at the beginning of the changeover process already existed or was only in the process of being established is completed, thus from the particular calling subscriber is again released. The time required for this changeover phase can be shortened if it is accepted in the bargain that a small percentage of long-time connections is by necessity subjected to a connection release through a termination in the exchange.

It can also be provided that in changeover switching not only the non-seized but also those connections are included in which the called party has already answered. This substantially shortens the time requirement for the changeover.

The changeover processes are limited to the unseized as well as additionally to those internal lines, in which the processes of establishing a connection are already completed, the particular called party, however, has not yet answered. These are connections which are in the call phase. In this case after beginning a changeover phase changeover switching takes place initially for all non-seized internal lines, and, subsequently, for all internal lines, which are seized with connections which are in the call phase or in reverse sequence or without a particular sequence of this nature. During the further course of the diversion phase further changeover switching takes place for internal lines which are free, for example through connection release as well as for internal lines via which connections were established which are entering the call phase. Changeover switching is then undertaken for internal lines through which connections are through-connected, in which the called party has already answered as well as those internal lines which are not busy and those that are being freed. These changeovers can be carried out immediately. They can also be carried out largely immediately, however for connections in the process of being established immediately individually subsequently or collected subsequently at the end of the diversion phase. All of these changeovers in one of two line groups assigned pairwise to each other are controlled by the individual control unit of the particular partner line group.

Carrying out the changeover switching, for example in the line group LTG2, takes place with the individual control units, for example GP1, in the manner that the individual control unit of one line group carries out the changeover in the particular other line group. Control paths are provided, for example Wy, between, each of the individual control units, for example GP1, each of the line groups, and the changeover switches, for example 2d1 to 2d4 in the (in each instance) other line group, for example GP2. Via these control paths also the additionally shown changeover switches u21 to u22, also LG2, LH2 are drivable. All connection paths can be conventionally designed in space division multiplex technology but they can also be realized in time division multiplex technology. In this case the internal lines Li11 to Li24 as well as the changeover switches 1d1 to 2d4 are operated in a manner known in time division multiplex technology in a manner that corresponding connection-individual channels can be changed over singly, i.e. connection-individually.

The changeovers can function for the purpose of switching over in the event of an operating failure in a line group, for example at its individual control (GP) or at its sub switching network (GS) or also at its time division multiples connection lines (L1/1 to L2/2) leading to the central switching network, the connection group-internal lines (Li . . . ) which in this line group lead from its line systems to external sub-switching network connections of its sub-switching network—and hence these line systems themselves—from these partial switching network connections to those of the particular partner line group. Therewith connection paths, which come from other exchanges and which are connected to these line systems, can remain in operation in that through-connections are available, which exist via the sub-switching network of the particular partner line group. In the process the time division multiplex subscriber lines, for example L2/1 and L2/2 can also be changed over with the changeover switch LG2 and LH2. This is only meaningful if the occurring operation disturbance does not lie in these time division multiplex subscriber lines.

If a changeover is being carried out due to an operating breakdown in a line group then to the particular switching measures only the two line groups assigned in pairs to each other are subjected. First the internal lines are connection-individually switched over in the described manner according to the time division multiplex principle. If the particular operating breakdown is again eliminated, then switching back the internal lines takes place. This takes best place according to the same rules as they are described in detail further up for the changeover switching processing upon the occurrence of an operating breakdown.

The described changeovers can also serve the purpose of preparing a processor changeover to standby. In this case changeover switching initially takes place for all pairs of line groups.

After changeover switching in this manner has been completed for all line groups, and specifically in preparation of changeover to standby, then in each of the pairs of line groups always only one individual control unit functions, for example GP1 and a sub switching network, for example GS1, for handling the switching operation of both line groups. In this exemplary operation the changeover switches 2d1 to 2d4 and u21 and u22 are in their operating position. It was further assumed above that for the exemplary case of a processor changeover switching to standby the switching operation initially is still being handled with central processor ZW1 still via the central switching network K1. For that reason the changeover switches LH1, LH2, LG1, LG2 are still in their shown rest position. In this operating condition—as is evident from FIG. 2—due to the changeover that has taken place the time division multiplex line L2/1 of the line group LTG2 via the make side of changeover switch u21 and the break side of changeover switch LG1 is connected to the sub switching network GS1 of line group LTG1.

In addition, in this situation the time division multiplex line L2/2 is connected via the make side of changeover switch u22 and the break side of changeover switch LH 2 in the time division multiplex terminal circuit LU2 to the sub-switching network GS2 of the same line group and is through this or through a line brought to it directly from this time division multiplex terminal circuit connectable to the individual control unit GP2. Through this path in preparation for the impending changeover to standby described more extensively further up the data loading process for program information and switching information for these control units takes place. As explained, after these changeovers loading of all individual control units respectively loading of their storage devices which had been temporarily withdrawn from switching operation through the changeover switching takes place. If in the switching processes, the changeover switches 2d1 to 2d4 and u21 and u22 had been activated (connection-individually) and if until now the processor ZW1 had been in operation, then for the control unit GP2 the data path for this loading is given via the make side of changeover switch u22 and the break side of changeover switch LH2. Now, analogous to the totality of the switched-through connections, in the line groups which had been in operation until then (for example LTG1) and the central switching network (for example K1) which had been in operation until by way of preparation parallel connections are set up via the other switching network (for example K2) and the other line groups (for example LTG2), and, specifically, with their individual control units (for example GP2) as well as with the other processor (for example SW2).

In each pair of line groups the changeover switches which had previously been actuated in the changeover switching processes, for example 2d1 to 2d4 and u21-/u22 are subsequently set back to their rest position, and the other changeover switches, for example 1d1 to 1d4 and u11/u12 are brought to their operating position. This takes place likewise in accordance with the principle of the invention of the connection-individual changeover switching of the internal lines. Likewise, the changeover switches LH1, LG1, LH2 and LG2 are switched from their rest position to their operating position, whereby the time division multiplex subscriber lines L1/1 to L2/2 are so switched over that the switching network K1 as well as also the processor SW1 are changed over to standby through the switching network K2 and the processor SW2. Subsequently, all connections run via the (in each instance) other line groups, example LTG2, and its sub-switching networks, for example GS2, as well as via the switching network K2. In this operating situation, consequently, connections which are connected through via the line systems 1DIU1 to 1DIU4 run via the make sides of changeover switches 1d1 to 1d4 and via the sub switching network GS2.

Following the processor changeover switching with the switching of all connections to the other central switching network (for example K2) and to the other sub-switching networks (for example GS2) the particular processor (for example ZW2) undertakes the reloading mentioned above of those individual control systems (for example GP1) which had just been taken out of switching operations through this changeover switching. After that again changeover switching of connections takes place in the manner according to the invention, i.e. connection-individual changeover switching of the internal lines (for example Li11 to Li14), for those line systems (for example 1DIU1 to 1DIU4) through which the connections are through-connected, which run via the sub-switching network (for example GSD2) of the other line group (for example LTG2). These connections are then switched back again to the sub-switching network (for example GS1) of that line group to which the line systems belong.

Lastly, the case that to the line systems, for example 1DIU1 outside of establishing the connection via other exchanges PCM transmission systems are connected, for example with 24 or 30 channels pairs each, of which one channel pair can always be occupied to establish an individual connection. In such transmission systems one channel pair functions is known manner for transmitting channel-individual signalization data. In this connection the RECOMMENDATIONS G704 in the Rot-Buch (red book) of the CCITT, VIII, Plenary Assembly in Malaga-Torremolinos, Oct. 8-19, 1984, Fascile III. 3, (pages 77 to 79) provide through the signaling system known as CAS system, to form within each of a continuous sequence of pulse frames continuously bit sequences of 8-bit each, of which each is referred to as a "word", or byte. There are 32 words in each pulse frame of which 30 are assigned singly to 30 channels. An additional word for each pulse frame functions to transmit channel-individual signaling data and, specifically always one half word for each channel. Accordingly, 16 pulse frames are combined to form one super pulse frame, whereby 32 halfwords for each super pulse frame are available, of which 30 half word are fixidly assigned to the 30 channels for transmitting signaling data.

The description up to this point refers primarily to connection setups, and specifically, to subscriber/subscriber connection. It is, however, known that each such connection is accompanied by signaling data specific to the connection as can be fund in the last mentioned literature reference and also in German patent No. DE-OS 31 22 275. It is not intended to provide in a manner similar to changeover switches 1d1 to 2d4 additional signaling changeover switches (si), shown only once (in 2DIU1) representative for all line systems in FIG. 2 for each line system, which signaling paths through-connect from each of the line systems (1DIU2) of a line group (LTG2) to the individual control system (GP2) in normal operation (via sr), and which similarly to changeover switches 1d1 to 2d4 can be switched over connection-individually, i.e. in this case channel-individually, and, specifically, in a manner corresponding to that of changeover switches 1d1 to 2d4 in order to supply in time division multiplex technology the signaling data associated with each connection in the course of a diversion process during a diversion phase to the individual control system GP2 or the individual control system GP1 (via sa) respectively in order to receive signaling data individual to the connection from there in the particular line system. These signaling changeover switches are, thus, brought in time division multiplex technology by the particular individual control unit, for example GP1, into its (shown) rest position and operating position, depending on to which of the two participating control units, for example GP1 respectively GP2, the particular half word of the particular signaling data is to be transferred, which is determined on the basis of to which of the two line groups, for example LTG1 or LTG2 the particular channel in the sense of the above description is assigned from the aspect of control technology.

In contrast to the CAS system through the CCITT recommendation 0.702 in the same Rot-Buch (Fascile VI. 7, pages 17) a signaling system known as CCS system has been suggested. According to it suggestions are made to depart from the rigid assignment of signaling halfword to channels seizable by connections and, instead, to form signaling data of greater extent and to handle assignment to particular channels with corresponding addressing. Assuming application of this signaling principle it is provided to control two line groups in such a way that their individual control unit at the time when it receives signaling data for a channel, which in the already described manner through changeover switching also in terms of control is assigned to the other line group, transfers the particular signaling data according to this assignment to this other line group (for example via path GL1/2 or a path similar to from GP1 to GP2 and vice versa) and supply in it, subsequently, to the particular individual control unit for further transfer or further processing.

We claim:

1. A switching system for a centrally controlled PCM time division multiplex telephone exchange, in which a central switching network provides connections and a central processor provides control and switching signal processing, and including a plurality of individual line groups having a sub-switching network for external connection of interexchange trunks or subscriber lines and having an individual control unit for receiving switching signals from said lines, for switching signal preprocessing and for switching signal transfer to the central processor and for switching signal transmission to said lines, and in which said plurality of individual line groups of the sub-switching networks are connected internally via groups of link lines groupwise separated to switching network connections of the central switching network, and in which the line groups are assigned pairwise to each other, and within each of said line groups line units provide external connection of said subscriber lines and/or said interexchange trunks; and wherein a particular line group is connected via internal lines to the sub-switching network of a first of two groups is additionally connectable to the sub-switching network of the other of said two groups, a partner line group, whereupon for connections, via a line unit of the first line group the corresponding switching signal processing and sub-switching network setting is controlled by the individual control unit of the second line group, the improvement comprising:

means for switching over said internal lines within the line group leading from a line system within one of said pairwise assigned line groups to its sub-switching network within a diversion phase individual to the connection to the sub-switching network of the other said line group, such that within said diversion phase, changeover switching is limited to internal lines which are not busy through release of said connection, to said internal lines via which said connections are through-connected to subscribers where a called party has answered internal lines seized by said connections, in which the process of establishing one of said connecting are completed, but wherein the called party has not yet answered, and such that with t he completion of the diversion phase, the connections in the process of being set up are released.

2. A switching system in accordance with claim 1 wherein:

changeover switching of the internal lines over which connections to a called party are established are carried out at the end of the diversion phase.

3. A switching system in accordance with claim 1, wherein:

preparation for a changeover switching within each of the pairs of line groups assigned to each other are transmitted from each of the two individual control units via individual transmission paths over pairs of line groups to the corresponding partner control unit, and wherein each of the two individual control units sets up discrete sub-connections over the sub-switching network of the particular assigned line group between internal sub-switching network connections and said external sub-switching network connections, whereby over said external sub-switching network connections, the line groups are connectable through the changeover switching within said diversion phase, and through such changeover switches the line units of a particular partner line group of said pairwise assigned line groups are connectable.

4. A switching system in accordance with claim 3, wherein:

connection data are transmitted from each of said two individual control units to its respective partner control unit in the switching operation in progress, such that each of the two individual control units establishes continuously on the basis of said connection data sub-connections in said sub-switching network.

5. A switching system in accordance with 4, wherein:
changeover switching of all the connections in the call phase is provided.

6. A switching system in accordance with claim 4, further including:

means for providing during a diversion phase for the connection in the process of being set up, only the connection data are transmitted, such that for each of said connections in the process of being set up changeover switching occurs after completion of the diversion phase.

7. A switching system in accordance with claim 5, wherein:

connections completely through-connected from subscriber station-to-subscriber station are changed over such that internal lines which are unseized are changed over, and that, subsequently, changeover switching of the internal lines occurs via run connections in the call phase.

8. A switching system in accordance with claim 1, further including:

means to switch back selected ones of said internal lines from one line group to another.

9. A switching system in accordance with claim 1, further including:

means for switching selected ones of said internal lines from one of said pairwise assigned line group to the other line group, such that subsequently information relating to switching is transmitted to the individual control unit of the one line group and stored, such that subsequently said selected internal lines of both line groups can be switched from the other line group to the one line group, and information relating to switching is transmitted to the individual control unit of the other line group, whereby the internal lines of the one line group are switched back from the other line group to the one line group.

10. A switching system in accordance with claim 9, wherein:

an additional central processor and an additional central switching network are provided, such that the sub-switching networks are connectable to each of said central switching network and said additional central switching network via links and that simultaneously with the changeover of the internal lines of both line groups a switchover of the line groups from the one to the other switching network occurs simultaneously with a processor changeover switch to standby.

11. A switching system in accordance with claim 1, wherein:

signal transmission paths for signal information individual to the connection is switched over to a particular partner line group of said pairwise assigned line groups and, from said individual control unit of said partner line group to that of the respective pairwise assigned line group.

12. A switching system in accordance with claim 1, wherein:

data from the central processor intended for a connection running via one internal line, for changeover switching, is transmitted simultaneously to particular line systems, each including a plurality of pairwise assigned line groups, wherein the connection not yet assigned is terminated.

* * * * *